April 17, 1934.  C. K. ELWOOD  1,955,178
TRAILER
Filed June 3, 1933   3 Sheets-Sheet 1

Inventor
CLAUDE K. ELWOOD
By R. H. Galbraith
Attorney

April 17, 1934.  C. K. ELWOOD  1,955,178
TRAILER
Filed June 3, 1933  3 Sheets-Sheet 2

Inventor
CLAUDE K. ELWOOD
By
R. H. Galbraith
Attorney

April 17, 1934.  C. K. ELWOOD  1,955,178

TRAILER

Filed June 3, 1933  3 Sheets-Sheet 3

Inventor
CLAUDE K. ELWOOD
By
Attorney

Patented Apr. 17, 1934

1,955,178

UNITED STATES PATENT OFFICE 1,955,178

TRAILER

Claude K. Elwood, Glendo, Wyo.

Application June 3, 1933, Serial No. 674,170

11 Claims. (Cl. 280—33.55)

This invention relates to a trailer for automotive vehicles and has for its principal object the provision of a trailer construction which will enable the driver to back the tow car any desired distance in any desired direction with assurance that the trailer will always lead in the proper direction. Heretofore it has been practically impossible for an automotive vehicle towing a trailer to reverse, owing to the fact that the trailer will swing off to one side or the other and attempt to assume a position alongside of the tow car. With the use of this invention, however, the driver may back or reverse his vehicle with assurance that the trailer will always lead along any desired path which the tow car is to follow.

Another object of the invention is to so construct the guiding mechanism of the trailer that it can be set from the driver's position for either following the tow car or for reverse guiding.

Another object is to provide efficient means for operating brakes upon the wheels of a trailer.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

Figure 1:
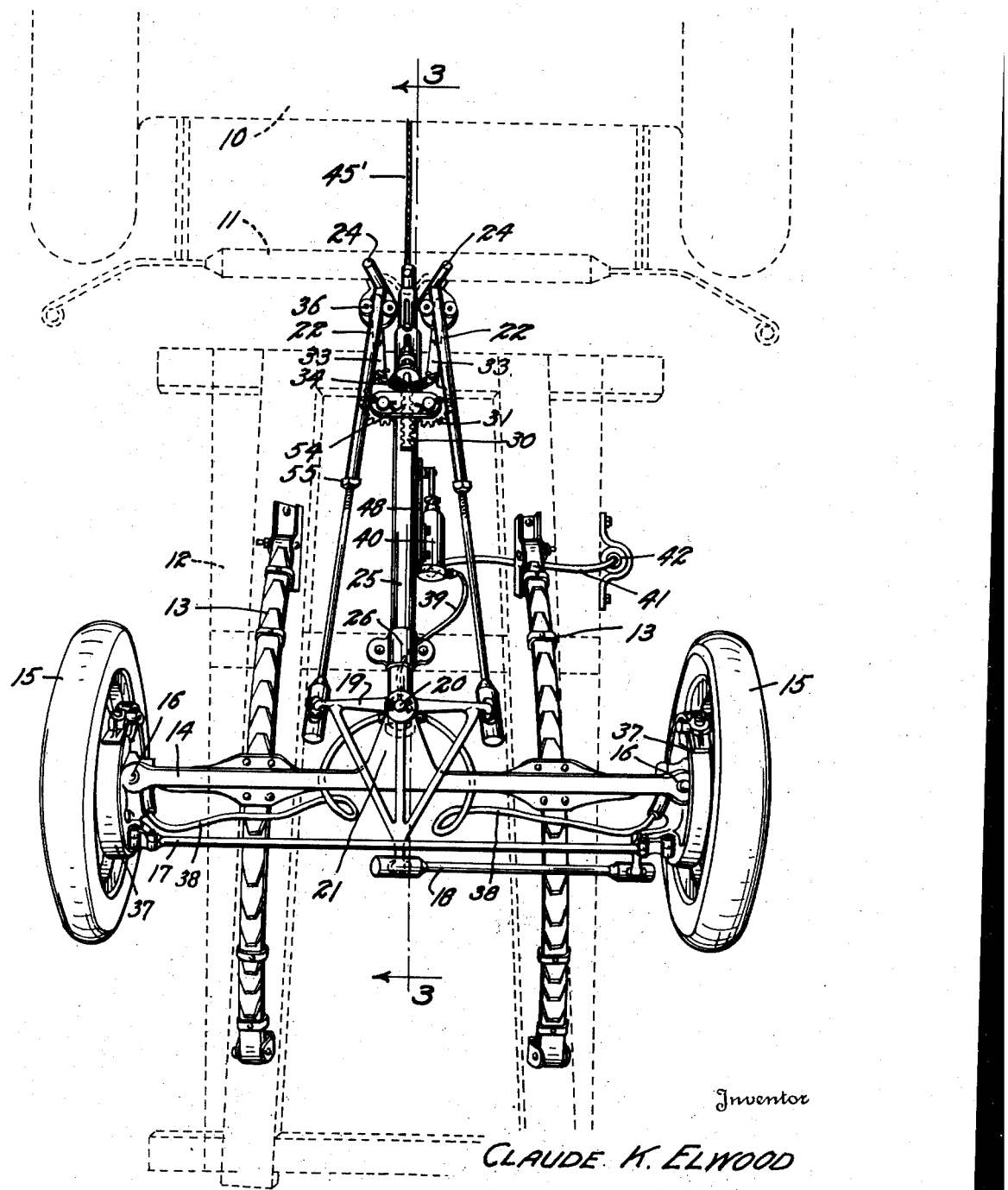
Fig. 1 is a bottom view looking upwardly beneath the bottom of a trailer equipped with this invention. In this view the operating mechanism is illustrated in the towing position ready for forward travel.

In the drawings: an automotive vehicle which will be herein designated the tow car, is illustrated in broken line at 10, provided with a rear bumper bar 11. The body of the trailer, upon which the invention is illustrated, is indicated at 12 supported upon leaf springs 13 from an axle 14. A pair of trailer wheels 15 are hingedly secured on each extremity of the axle 14 upon suitable steering knuckles 16. The axle and wheel construction may be similar to conventional front axle and wheel construction of the usual automotive vehicle. The two wheels are caused to turn in uniformity by means of a tie rod 17 and are guided by means of a radius rod 18 which extends from one extremity of a triangular yoke member 19. The yoke member 19 is pivoted at 20 on bracket members 21 extending forwardly from the axle 14.

It can be readily seen that if the yoke member 19 is swung upon its pivot 20, it will communicate its movement to the trailer wheels 15. This swinging movement is imparted by means of a pair of push rods 22, provided with T-shaped heads 24, which extend forwardly of the trailer so as to be engaged by the rear bumper bar 11. The push rods 22 and 23 can be separated to the active position of Fig. 2 or the inactive position of Fig. 1 by means of the following mechanism.

A draw bar 25 is slidably mounted in a rear support 26 and a forward support 27, both secured to the bottom of the trailer 12. The draw bar 25 is connected to the midpoint of the bumper bar 11 by means of any suitable attachment device. As illustrated, an ear 28 extends rearwardly from the bumper bar 11 and is provided with a suitable hole to receive a draw bolt 29 in the extremity of the draw bar 25. A double rack member 30 extends rearwardly from the front support 27 and is provided with teeth in both its sides. A pair of rack gears 31 mesh with these teeth. The rack gears 31 are journalled on a bracket member 32 which is secured to the draw bar 25. A bottom plate 54 extends between the gear shafts below the rack member to tie the former together and to support the latter.

A lever arm 33 is formed on each of the rack gears 31 which extend oppositely outward therefrom connected by a tension spring 34. The extremity of each lever arm 33 is provided with a pivoted plate 35 upon each of which a pair of grooved rollers 36 are secured. The grooves of the rollers 36 engage the sides of the push rods 22 so as to support the forward extremities thereof.

It can be seen from this construction that if the trailer body 12 is pulled rearwardly from the tow car 10, the rack bar 30 will be forced rearwardly between the rack gears 31 causing the latter to swing the arms 33 inwardly to the position of Fig. 1, thus positioning the push rods where they will not contact with the bumper bar 11. In this position the trailer is a simple trailer and can be towed forwardly similar to all trailers.

Figure 2:
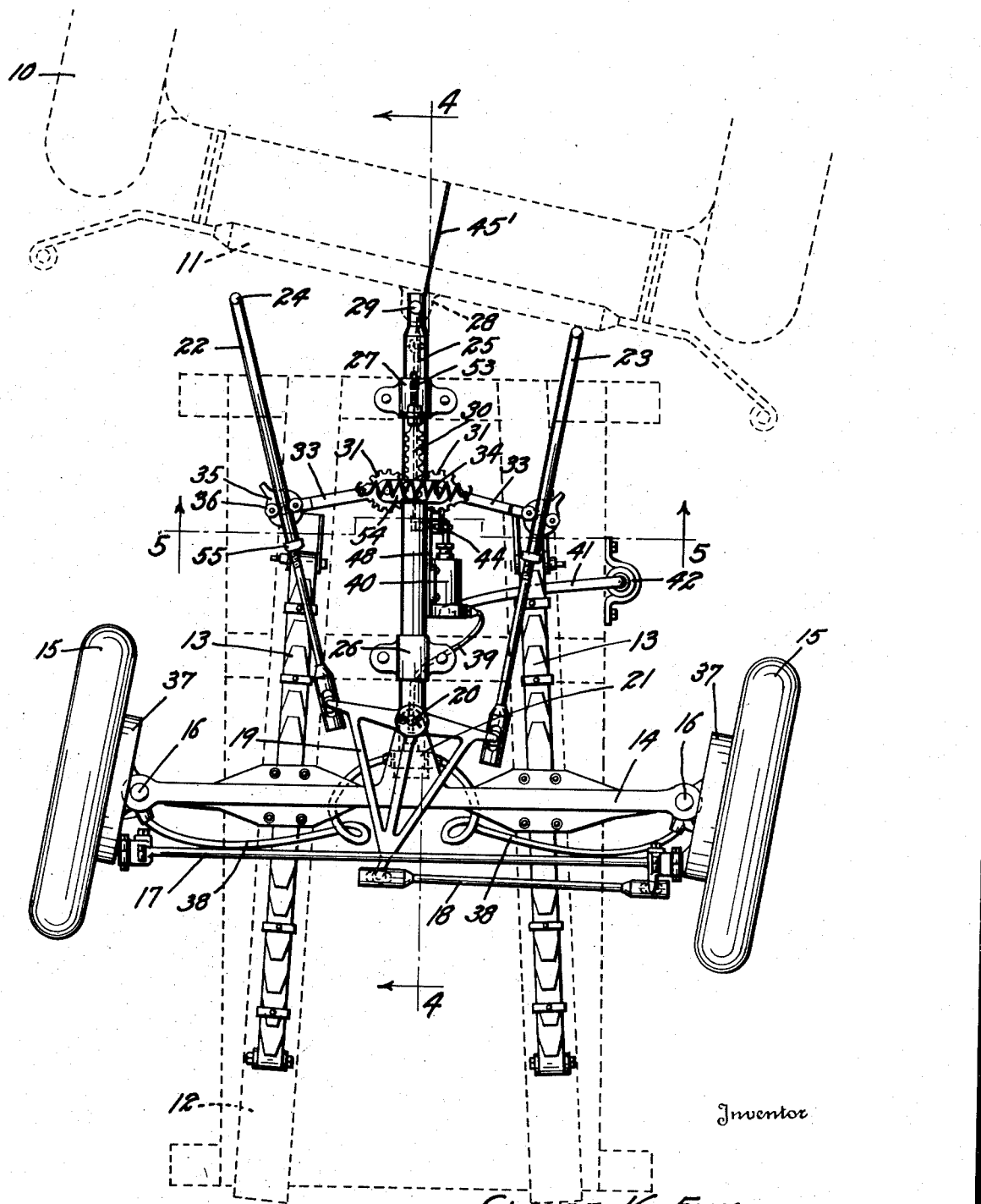
Fig. 2 is a similar view illustrating the mechanism in the reverse or guiding position ready for rearward travel.
Figure 3:
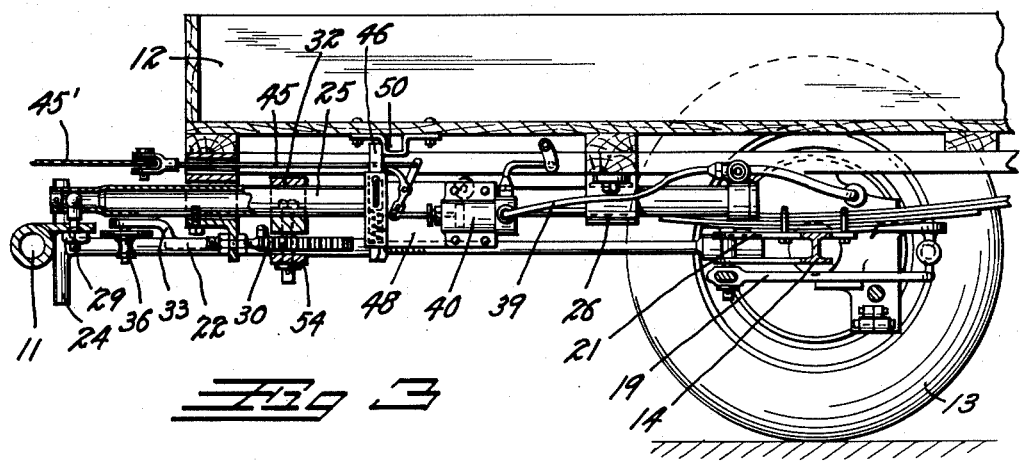
Fig. 3 is a longitudinal section through the trailer taken on the line 3—3, Fig. 1.
Figure 4:
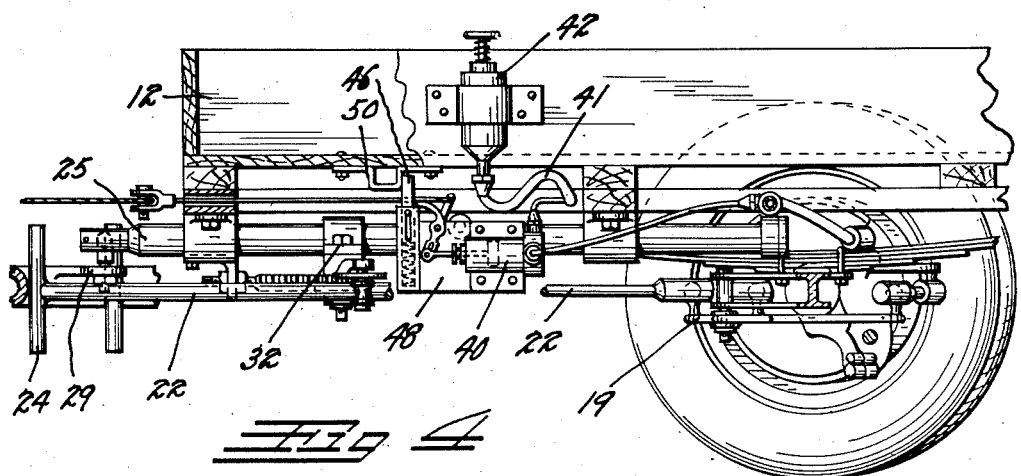
Fig. 4 is a similar longitudinal section taken on the line 4—4, Fig. 2.
Figure 5:
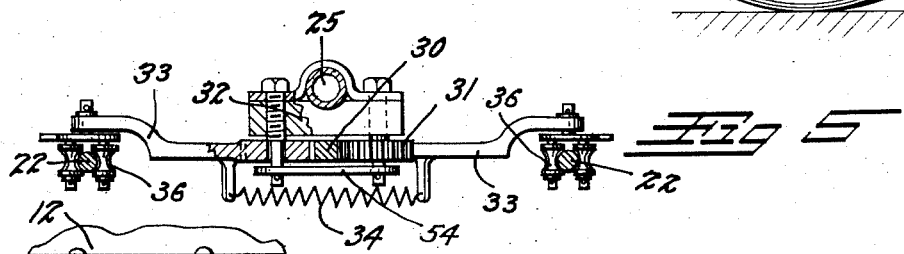
Fig. 5 is a detail cross section taken on the line 5—5, Fig. 2.
Figure 6:
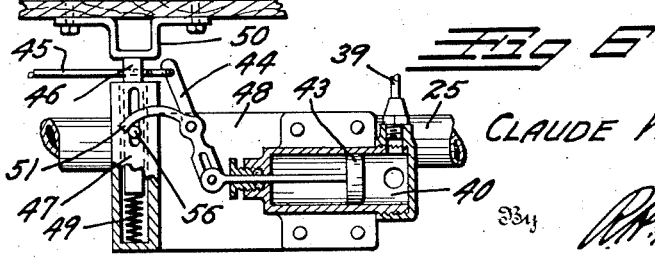
Fig. 6 is a detail section through the master brake cylinder.

It can also be seen that if the trailer body 12 is pushed toward the tow car 10 the rack bar 30 will be pulled from between the rack gears 31 causing the latter to swing the push rods 22 apart to the position of Fig. 2. When in this position the mechanism is set for rearward travel and any relative angular movement between the tow car and the trailer will cause the bumper bar 11 to strike one or the other of the push rods 22, thus guiding the trailer wheels to maintain them substantially parallel to the rear wheels of the tow car.

As thus far described, the trailer may be operated, provided the driver manually moves the trailer body to properly set the push rods. If it is desired to eliminate the manual operation, the following mechanism may be employed.

Each of the trailer wheels 15 is provided with a brake mechanism 37, preferably of the hydraulic type. Fluid conduits 38 lead from each braking mechanism to a common conduit 39 which in turn leads to a master cylinder 40. The master cylinder 40 is mounted on a plate 48 secured on the draw bar 25. Fluid is supplied to the braking mechanism through a supply conduit 41 leading from a reservoir and pump 42 conveniently located on a trailer. The master cylinder 40 is preferably secured on the tow bar 25, and contains the usual piston 43 for placing the fluid in the system under pressure.

The piston 43 is actuated from a bell crank lever 44, the free extremity of which is connected by means of a pull rod 45 and a cable 45' with any suitable actuating device at the driver's position in the tow car 10. For instance a hand lever or a foot pedal could be employed to place tension in a cable 45'.

The driver can utilize the braking mechanism for accomplishing the shifting function, previously described as manually operated. For instance, should he desire to expand the push rods 22 for backing, he would actuate the cable 45' to cause the master cylinder to apply the brakes to the wheels 15. He would then reverse the tow car. This would cause the rack gears to move rearwardly along the rack 30 and spread the rods 22 to guide the trailer during the backing operation. After the rods were spread, the braking mechanism could be released.

Should he desire to swing the arms again to the inactive or towing position of Fig. 1, he would actuate the cable 45' to set the brakes on the trailer then drive the tow car forwardly. This would cause the rack gears to move forwardly on the rack 30 and swing the push rods 22 inwardly to the trailing position of Fig. 1.

It is of course desirable to have some means for locking the mechanism in either the backing or trailing positions. For manual operation any suitable type of latch could be employed. For automatic operation the following mechanism may be used. A latch dog 46 is mounted in a vertical slide 47 secured on the master cylinder plate 48. A compression spring 49 constantly urges the dog 46 upwardly. A V-shaped latch bar 50 is secured to the bottom of the trailer body 12 immediately over the dog 46. The dog 46 engages the front of the latch bar 50 when the trailer is in the trailing position of Fig. 1, and the back of the latch bar 50 when the trailer is in the backing position of Fig. 2. The dog 46 is withdrawn from engagement with the latch bar 50 by means of a cam arm 51 projecting from the bell crank lever 44. The cam arm 51 projects forwardly so as to engage a pin 56 in the dog 46.

Thus it can be seen that when the cable 45' is pulled upon to cause the master cylinder to set the brakes, the cam arm 51 will withdraw the dog 46 so as to allow relative movement between the draw bar 25 and the trailer. As soon as the brakes are released, the dog 46 is released and immediately engages the latch bar 50 and locks the mechanism in whatever position it then is.

The outward and inward movement of the draw bar may be limited in any desired way. As illustrated, a longitudinal slot 52 is formed in the draw bar 25 and a set screw 53 is threaded through the front support 27 into this slot. The length of the slot may be used to limit the movement of the draw bar, if desired. Its principal function however is to prevent the draw from rotating so that the rack gears will always remain in proper position.

It is preferred to have the arms swing backwardly a sufficient distance to place the spring 34 beyond the dead center point as shown in Fig. 2 so that it will not be urging the arms closed when in the backing position. Yet so that it will assist in closing the arms when desired.

It is desirable to form the push rods 22 so that their length may be adjusted to obtain the proper spacing between the bumper bar 11 and the T-heads 24. This may be accomplished by forming a portion of each rod of a tube which is threaded over the remaining portion, as illustrated to vary the total length of the push rod. A set nut 55 may be employed on each arm to lock the two parts thereof in the proper adjusted position.

It can be seen from the above that with this mechanism a driver can proceed forwardly, with the mechanism in the position of Fig. 1, with assurance that the trailer will follow his tow car. Should he desire to reverse he simply sets the brakes on the trailer, backs the tow car, then releases the trailer brakes. The trailer wheels now will always parallel the rear wheels of the tow car so that the trailer can be backed in any desired direction. When the backing operation has been completed, he simply again sets the trailer brakes, starts forwardly, then releases the brakes and the trailer is ready to follow the car forwardly. All of this is accomplished without the driver being required to leave his seat in the tow car.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A trailer comprising: a body; an axle beneath said body; wheels pivoted on the extremities of said axle so that they may be swung at angles to the axis of said body; a guide member pivoted intermediate said wheels and operatively connected thereto so as to guide said wheels; push rods extending forwardly from said guide member in a position to be engaged by said automotive vehicle so as to transmit the angular movement of said vehicle to said wheels; a draw bar positioned between said push rods and arranged for pivotal connection to said automotive vehicle, said draw bar being longitudinally moveable with reference to said trailer body; and means for transmitting said longitudinal movement to said push rods to cause the latter to separate from and approach each other.

2. In a trailer for an automotive vehicle: an axle member; steerable wheels on the extremities of said axle member; a steering yoke pivotally supported by said axle member; a radius rod for communicating the movements of said steering yoke to said wheels; a draw bar extending forwardly from said trailer and arranged for pivotal attachment to said automotive vehicle; a push rod at each side of said draw bar, said push rods being hingedly connected at their rearward extremities to said steering yoke; supporting means for the forward extremities of said push rods arranged to allow longitudinal movement thereof so that the contacting of either push rod with said automotive vehicle will swing said steering yoke to actuate said wheels.

3. A mechanism for guiding the wheels of a trailer in consequence of the movements of a tow car comprising: a steering member operatively connected to guide the wheels of said trailer; a push rod extending forwardly from said steering member at each side of the longitudinal center line of said trailer, said push rods contacting with said tow car to actuate said steering member in consequence of differential movements between said tow car and said trailer; and means for causing the forward extremities of said push rods to approach or separate from each other when desired.

4. A mechanism for guiding the wheels of a trailer in consequence of the movements of a tow car comprising: a steering member operatively connected to guide the wheels of said trailer; a push rod extending forwardly from said steering member at each side of the longitudinal center line of said trailer, said push rods contacting with said tow car to actuate said steering member in consequence of differential movements between said tow car and said trailer; a draw bar extending forwardly from said trailer between said push rods to a pivotal connection between said arms, said draw bar being longitudinally shiftable in reference to said trailer; and means for causing said push rods to separate from and approach each other in consequence of the shifting of said draw bar.

5. A mechanism for guiding the wheels of a trailer in consequence of the movements of a tow car comprising: a steering member operatively connected to guide the wheels of said trailer; a push rod extending forwardly from said steering member at each side of the longitudinal center line of said trailer, said push rods contacting with said tow car to actuate said steering member in consequence of differential movements between said tow car and said trailer; and a draw bar extending forwardly from said trailer between said push rods to a pivotal connection between said arms, said draw bar being longitudinally shiftable with reference to said trailer; a bracket member secured to said draw bar; arms hinged to said bracket member and extending oppositely opposite to a connection with said push rods; a means fixed to said trailer and adapted to contact with and actuate said arms as the latter move with said draw bar so as to cause said push rods to approach or separate from each other in consequence of the shifting of said draw bar.

6. A mechanism for guiding the wheels of a trailer in consequence of the movements of a tow car comprising: a steering member operatively connected to guide the wheels of said trailer; a push rod extending forwardly from said steering member at each side of the longitudinal center line of said trailer, said push rods contacting with said tow car to actuate said steering member in consequence of differential movements between said tow car and said trailer; and a draw bar extending forwardly from said trailer between said push rods to a pivotal connection between said arms, said draw bar being longitudinally shiftable with reference to said trailer; a bracket member secured to said draw bar; arms hinged to said bracket member and extending oppositely opposite to a connection with said push rods; a gear connected to each of said arms; a rack positioned between said gears, said rack being fixedly secured to said trailer so that as said draw bar shifts said gears will be moved along said rack and rotated to swing said arms so as to cause said push rods to approach or separate from each other.

7. A mechanism for guiding the wheels of a trailer in consequence of the movements of a tow car comprising: a steering member operatively connected to guide wheels of said trailer; a push rod extending forwardly from said steering member at each side of the longitudinal center line of said trailer, said push rods contacting with said tow car to actuate said steering member in consequence of differential movements between said tow car and said trailer; a draw bar extending forwardly from said trailer between said push rods to a pivotal connection between said arms, said draw bar being longitudinally shiftable in reference to said trailer; and means for causing said push rods to separate from and approach each other in consequence of the shifting of said draw bar; and means for locking said draw bar at either extremity of its shifting movement.

8. A mechanism for guiding the wheels of a trailer in consequence of the movements of a tow car comprising: a steering member operatively connected to guide the wheels of said trailer; a push rod extending forwardly from said steering member at each side of the longitudinal center line of said trailer, said push rods contacting with said tow car to actuate said steering member in consequence of differential movements between said tow car and said trailer; a draw bar extending forwardly from said trailer between said push rods to a pivotal connection between said arms, said draw bar being longitudinally shiftable in reference to said trailer; means for causing said push rods to separate from and approach each other in consequence of the shifting of said draw bar; and braking means on said trailer to cause the latter to resist moving with said draw bar so as to cause a relative shifting between said draw bar and said trailer.

9. A mechanism for guiding the wheels of a trailer in consequence of the movements of a tow car comprising: a steering member operatively connected to guide the wheels of said trailer; a push rod extending forwardly from said steering member at each side of the longitudinal center line of said trailer, said push rods contacting with said tow car to actuate said steering member in consequence of differential movements between said tow car and said trailer; a draw bar extending forwardly from said trailer between said arms, said draw bar being longitudinally shiftable in reference to said trailer; means for causing said push rods to separate from and approach each other in consequence of the shifting of said draw bar; means for locking said draw bar at either extremity of its shifting movement; braking means on said trailer to cause the latter to resist moving with said draw bar so as to cause a relative shifting between said drawbar and said trailer; brake actuating means; and a lock releasing mechanism actuated by said brake actuating means so as to release said locking means when said braking means are actuated.

10. A mechanism for guiding the wheels of a trailer in consequence of the movements of a tow car comprising: a steering member operatively connected to guide the wheels of said trailer; a push rod extending forwardly from said steering member at each side of the longitudinal center line of said trailer, said push rods contacting with said tow car to actuate said steering member in consequence of differential movements between said tow car and said trailer; a draw bar extending forwardly from said trailer between said push rods to a pivotal connection between said arms, said draw bar being longitudinally shiftable in reference to said trailer; and means for causing said push rods to separate from and approach each other in consequence of the shifting of said draw bar; and means for maintaining said trailer stationary while said draw bar is shifted by movement of said tow car.

11. A mechanism for guiding the wheels of a trailer in consequence of the movements of a tow car comprising: a steering member operatively connected to guide the wheels of said trailer; a push rod extending forwardly from said steering member at each side of the longitudinal center line of said trailer, said push rods contacting with said tow car to actuate said steering member in consequence of differential movements between said tow car and said trailer; a draw bar extending forwardly from said trailer between said push rods to a pivotal connection between said arms, said draw bar being longitudinally shiftable in reference to said trailer; means for causing said push rods to separate from and approach each other in consequence of the shifting of said draw bar; hydraulic brakes on said trailer; a master cylinder on said trailer for actuating said brakes; a piston in said master cylinder; a latch for locking said draw bar at either extreme of its shiftable movement; and means actuated from the movement of said piston for releasing said latch.

CLAUDE K. ELWOOD.